A. F. CARTON.
SEED CORN DRIER.
APPLICATION FILED JUNE 3, 1918.
1,293,333.
Patented Feb. 4, 1919.
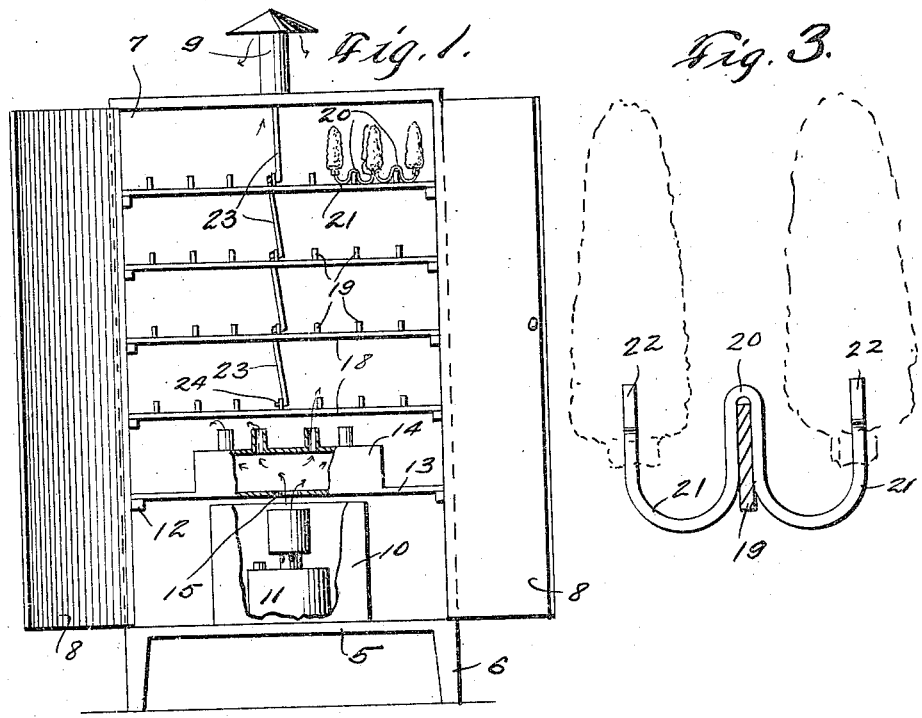
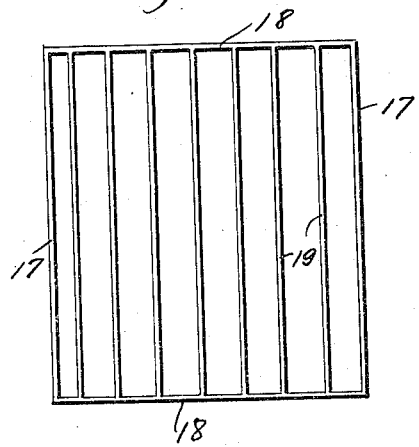
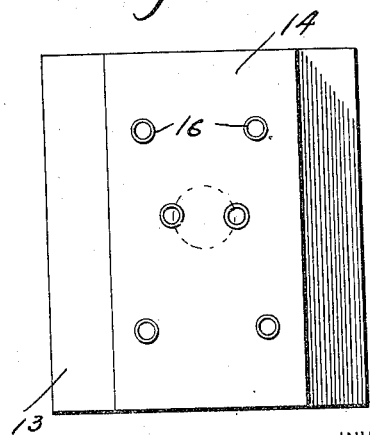
INVENTOR
Albert F Carton
WITNESSES
BY
ATTORNEY

UNITED STATES PATENT OFFICE.

ALBERT F. CARTON, OF PIPESTONE, MINNESOTA.

SEED-CORN DRIER.

1,293,333.

Specification of Letters Patent. Patented Feb. 4, 1919.

Application filed June 3, 1918. Serial No. 237,961.

*To all whom it may concern:*

Be it known that I, ALBERT F. CARTON, a citizen of the United States, residing at Pipestone, in the county of Pipestone and State of Minnesota, have invented certain new and useful Improvements in Seed-Corn Driers, of which the following is a specification.

This invention is a seed corn drier and has for its principal object the production of an efficient structure for supporting ears of seed corn therein for permitting of free circulation of heat about the ears for positively drying the corn.

Another object of this invention is the production of a seed corn drier which is provided with a plurality of removable racks, means being carried upon the racks for supporting the ears of seed corn, whereby the racks may be easily inserted into the casing after being filled with corn to be dried or may be readily removed from the casing after the corn has been dried.

Another object of this invention is the production of a seed corn drier wherein the racks are provided with elongated ribs, while clips are provided for gripping the ribs and releasably carrying ears of seed corn thereon, thus causing the ears to be maintained in vertical and substantially parallel arrangement, thus allowing the heat to freely circulate between the ears for drying the corn.

Another object of this invention is the production of a seed corn drier, wherein a heating drum is carried within the casing and is supplied with heat from a lamp positioned therebelow, thus allowing the heat to pass from the drum and freely circulate through the racks for drying the corn supported thereon.

One practical form of construction and assembly of the present invention will be hereinafter described and is illustrated in the accompanying drawings, in which—

Figure 1 is a front elevation of the seed corn drier, portions of the heating drum and lamp being broken away.

Fig. 2 is a top plan view of one of the racks.

Fig. 3 is an enlarged side elevation of one of the clips, showing a rib of one rack in section and illustrating the manner in which ears of corn are carried upon the clip, and Fig. 4 is a top plan view of the heating drum.

In the preferred embodiment of the present invention, about to be described, it will be seen that the base 5 of the casing is provided with suitable supporting standards 6. The inclosed casing 7 is carried upon the base 5 and has doors 8 hinged thereon in any suitable manner. It is therefore seen that the doors may be swung to a closed position for closing the casing, although when so desired the doors may be swung to an open position, as illustrated in Fig. 1. The ventilator 9 is carried by the top of the casing 7, as clearly shown in Fig. 1 and thus provides means for allowing the surplus heat to escape as well as the moisture which will arise when the ears of corn are being dried.

The lamp casing 10 is positioned in the casing 7 and rests upon the base 5 and carries a lamp 11 therein. This lamp 11 may be of any suitable construction for heating the heating drum to be hereinafter described and it is of course obvious that any other suitable form of heating means may be employed for heating the interior of the casing 7, without departing from the spirit of the present invention.

A plurality of horizontally extending supporting cleats 12 are carried within the casing 7 and in horizontal alinement with each other on opposite sides of the casing as also shown in Fig. 1. These cleats are spaced apart for supporting the heating drum and the racks to be hereinafter described.

The heating drum consists of a platform 13, which is substantially rectangular as shown in Fig. 4 to conform to the shape of the casing 7. It is of course obvious that the casing may be of any desired shape to conform to the contour of the interior of the casing. The hollow drum 14 is carried or formed upon the platform 13 and it will be noted that the platform 13 is provided with an opening 15 for permitting the heat of the lamp to pass through the platform and into the interior of the drum 14. The necks 16 lead from the top of the drum 14 in spaced relation with respect to each other, and thus permit the heated air to pass from the interior of the drum and to circulate through the racks and around within the interior of the casing 7.

The removable racks are similarly constructed and by referring to Fig. 2 it will be noted that each rack comprises side bars 17 connected by end bars 18. The ribs 19 have their ends formed upon or secured in any suitable manner to the end bars and these ribs 19 extend parallel to the side bars 17. By referring to Figs. 1 and 3 it will be noted that the ribs 19 are comparatively thin and project upwardly for a distance beyond the upper surface of the side bars 17 and end bars 18 of their respective racks. These racks are of such shape as to conform to the shape of the casing 7 and for this reason may be positioned upon the cleats 12 carried within the casing. Therefore, the heat which passes from the heating drum will freely circulate through the racks, as will be hereinafter fully set forth.

The clips are similarly constructed and are formed from single strips of material comprising a substantially inverted U-shaped body 20 which has its side portions secured together, thus facilitating the grip on a rib 19. The lower portions of the body 20 are curved outwardly to form retaining fingers 21 which are curved upwardly to extend parallel to the body 20 and which have their upper ends sharpened as indicated at 22. Thus it will be seen that the clips are substantially W-shaped for facilitating the gripping of the ribs and at the same time allowing ears of corn to be inserted or placed upon the pointed ends 22 of the fingers 21. Before a rack is placed within the casing, the clips have ears of corn placed thereon as indicated in Fig. 3 and then the clips may in turn be placed upon the ribs of the rack until the rack is filled, then the rack may be placed within the casing to rest upon a pair of cleats 12.

In order to reinforce the central portions of the racks after corn has been placed thereon and they are carried within the casing, the hanger bars 23 may be employed, as illustrated in Fig. 1. The hanger bars have hooked ends 24 which may be inserted through suitable openings formed in the ribs 19 of the racks and for this reason the racks may be hooked together for reinforcing the racks.

Under ordinary conditions seed corn is selected and is hung within a building where the sprouts are likely to freeze and thus ruin the corn for seed purposes.

However, with the present invention, the selected ears of corn are inserted upon the pointed ends 22 of the fingers 21 as hereinbefore specified, and as these clips are filled, they are in turn placed in gripping engagement upon a rib, as illustrated in Figs. 1 and 3. After the ribs of a rack have been filled, the rack may then be inserted in the casing to rest upon a plurality of the cleats. The hanger bars 23 may then be inserted through the racks to engage the central ribs, as shown in Fig. 1 for reinforcing the racks at their central portions. At this time the heating drum may be placed within the casing on the lowest plate, as illustrated in Fig. 1. The lamp may be lighted and inserted within the casing and then the doors 8 may be closed. As the drum is heated, it is obvious the heated air will pass from the drum through the necks 16 while the drum will also radiate heat. This heat and heated air will pass around through the racks and owing to the spacing apart of the ears carried within the casing and their vertical position, the heat will easily circulate around between the ears of corn. The moisture arising from the corn which is drying as well as the rising heat may pass from the casing through the ventilator 9. It is obvious as many ears of corn as desired may be placed within the casing and due to the artificial heat will be quickly dried and then may be removed and placed in a desired receptacle without danger of injury due to atmospheric conditions.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a casing, heating means carried within said casing, removable racks carried within said casing, each rack comprising side and end bars, ribs connected to the end bars and extending parallel to the side bars and removable clips carried upon said ribs.

2. In a device of the class described, the combination of a casing, heating means carried within said casing, a plurality of removable racks carried within said casing, each rack including a plurality of ribs, and substantially W-shaped clips removably engaging said ribs, thus being supported and at the same time allowing ears of corn to be placed in engagement therewith.

3. In a device of the class described, the combination of a casing, heating means carried within said casing, supporting elements positioned within said casing, clips positioned upon said supporting elements, each clip comprising a substantially inverted U-shaped body having upwardly curved fingers pointed at their upper ends, the upper ends of said fingers extending parallel to the body, whereby said body may be positioned upon said supporting elements to grip the same, while the fingers will allow ears of corn to be carried thereon.

4. In a device of the class described, the combination of a casing, a heating element carried within said casing, a platform carried within said casing, a hollow heating drum carried upon said platform, necks extending upwardly from the top of said heating drum, whereby the heat from the heating element may pass through said drum and then be distributed from said necks around the interior of the casing and supporting means carried within said casing above said heating drum.

5. In a device of the class described, the combination of a casing, supporting means carried within said casing, racks positioned upon said supporting means, thus being removably supported, supporting means carried by said racks, and hanger bars having hooked ends engaging said racks and connected to said casing, thus reinforcing said racks.

6. In a device of the class described, the combination of a casing, heating means carried within said casing, removable racks carried within said casing, each rack comprising side and end bars, ribs connected to the end bars and extending parallel to the side bars, and supporting means mounted upon said ribs.

7. In a device of the class described, the combination of a casing, cleats carried within said casing, heating means positioned within said casing, removable racks carried upon said cleats, each rack comprising side and end bars, ribs connected to a plurality of the bars in each rack, and supporting means mounted upon said ribs.

8. In a device of the class described, the combination of a casing, a heating element carried within said casing, a hollow heating drum positioned within said casing, means for supporting said drum above said heating element, necks extending upwardly from the top of said drum whereby heat from the heating element will pass through said drum and then be distributed from said necks around the interior of the casing, and supporting means carried within said casing above said drum.

9. In a device of the class described, the combination of a casing, a heating element carried within said casing, a platform carried within said casing, a hollow heating drum carried upon said platform, dispensing means evenly distributed about the upper portion of said drum, whereby the heat from the heating element will pass through said drum and be equally distributed around the interior of the casing, and supporting means carried within said casing above said heating drum.

10. In a device of the class described, the combination of a casing, removable racks carried within said casing, each rack including a plurality of spaced ribs, supporting means carried upon said ribs, heating means carried within said casing below said racks, whereby heat will arise from said heating means and pass through said racks toward the upper portion of the casing.

In testimony whereof I affix my signature in presence of two witnesses.

ALBERT F. CARTON.

Witnesses:
L. N. MARSDEN,
JEANETTE OLSON.

Copies of this patent may be obtained for five cents each, by addressing the "Commissioner of Patents, Washington, D. C."